(12) United States Patent
Seo et al.

(10) Patent No.: US 10,038,479 B2
(45) Date of Patent: Jul. 31, 2018

(54) RECEIVING DEVICE AND METHOD USING SINGLE RF CHAIN

(71) Applicant: ELECTRONICS AND TELECOMMUNICATIONS RESEARCH INSTITUTE, Daejeon (KR)

(72) Inventors: Seok Seo, Daejeon (KR); Hyung Jin Kim, Daejeon (KR); Jae Su Song, Daejeon (KR); Jung Hoon Oh, Daejeon (KR); Seong Chul Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/597,286

(22) Filed: May 17, 2017

(65) Prior Publication Data

US 2018/0026682 A1  Jan. 25, 2018

(30) Foreign Application Priority Data

Jul. 20, 2016 (KR) .......................... 10-2016-0092136

(51) Int. Cl.
*H04B 7/10* (2017.01)
*H04L 1/02* (2006.01)
(Continued)

(52) U.S. Cl.
CPC ......... *H04B 7/0417* (2013.01); *H04L 1/0631* (2013.01); *H04L 25/0256* (2013.01); *H04W 72/046* (2013.01); *H04W 72/0446* (2013.01)

(58) Field of Classification Search
CPC . H04B 7/0417; H04L 25/0256; H04L 1/0631; H04W 72/046; H04W 72/0446; H01Q 3/40
(Continued)

(56) References Cited

U.S. PATENT DOCUMENTS

| 8,331,473 | B2 | 12/2012 | Cheong et al. |
| 2009/0207077 | A1* | 8/2009 | Hwang ..................... H01Q 3/40 342/374 |
| 2012/0140799 | A1 | 6/2012 | Lim et al. |

FOREIGN PATENT DOCUMENTS

JP 3725793 B2 12/2005

OTHER PUBLICATIONS

Robert Bains et al., "Using Parasitic Elements for Implementing the Rotating Antenna for MIMO Receivers", IEEE Transactions on Wireless Communications, vol. 7, No. 11, pp. 4522-4533, Nov. 2008.

* cited by examiner

*Primary Examiner* — Phuong Phu
(74) *Attorney, Agent, or Firm* — LRK Patent Law Firm

(57) ABSTRACT

A receiving device and method using a single RF chain includes a reception antenna module radiating a plurality of orthogonal beam patterns to receive a signal, a single RF chain processing a reception signal from the reception antenna module, a signal component extracting unit extracting a reception signal component corresponding to each beam pattern using the reception signal received through the reception antenna module and the single RF chain and a code value previously allocated to the plurality of beam patterns, and a beam pattern controller controlling a beam pattern radiated by the reception antenna module.

14 Claims, 7 Drawing Sheets

(51) Int. Cl.
*H04B 7/0417* (2017.01)
*H04L 25/02* (2006.01)
*H04W 72/04* (2009.01)
*H04L 1/06* (2006.01)

(58) Field of Classification Search
USPC .................................. 375/267, 347; 342/374
See application file for complete search history.

RECEIVING DEVICE AND METHOD USING SINGLE RF CHAIN

CROSS-REFERENCE TO RELATED APPLICATION

This application claims priority to and the benefit of Korean Patent Application No. 10-2016-0092136 filed in the Korean Intellectual Property Office on Jul. 20, 2016, the entire contents of which are incorporated herein by reference.

BACKGROUND OF THE INVENTION

1. Field of the Invention

The present invention relates to a receiving device and method using a single radio frequency (RF) chain.

2. Description of Related Art

A multiplexing and diversity receiving scheme using a single RF chain uses beam pattern switching or a beam pattern rotation scheme. Here, as a means for beam pattern switching or beam pattern rotation, there is a structure of a plurality of active antenna array and a phased array using a phase shifter, and a scheme of applying a variable reactance to a parasitic element and adjusting a reactance value, and the like, is used.

According to a related art multiplexing and diversity reception scheme using a single RF chain, beam space sampling is performed by switching or rotating a beam pattern within one symbol duration. Such a beam pattern switching or beam pattern rotation scheme has a problem that a spectrum is spread due to a sampling effect. Also, since spectrum spreading is also applied to an adjacent channel signal, adjacent channel interference occurs, resulting in a degradation of performance of a reception signal.

Also, since a beam pattern is switched or rotated within one symbol duration, average power of a signal received in each beam pattern is reduced to degrade performance of a signal-to-noise ratio (SNR) of a signal received in each beam pattern over an existing multi-antenna technology.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a receiving device having advantages of providing a multiplexing gain and a diversity gain using a single RF chain without switching or rotating an antenna beam pattern.

Technical subjects of the present invention are not limited to the foregoing technical subjects and any other technical subjects not mentioned will be clearly understood by a skilled person in the art from the following description.

An exemplary embodiment of the present invention provides a receiving device using a single RF chain including: a reception antenna module radiating a plurality of orthogonal beam patterns to receive a signal; a single RF chain processing a reception signal from the reception antenna module; a signal component extracting unit extracting a reception signal component corresponding to each beam pattern using the reception signal received through the reception antenna module and the single RF chain and a code value previously allocated to the plurality of beam patterns; and a beam pattern controller controlling a beam pattern radiated by the reception antenna module.

The beam pattern controller may change a beam pattern of the reception antenna module at a starting point of each time slot.

The beam pattern controller may control a beam pattern to correspond to a codeword allocated to each beam pattern.

The beam pattern controller may determine a phase of a corresponding beam pattern according to a codeword allocated to each beam pattern.

The codeword may have orthogonal characteristics.

The signal component extracting unit may include: a look-up table (LUT) storing a complex conjugate value of a code value allocated to each of a plurality of beam patterns; and a correlator calculating a correlation value between a reception signal and a codeword allocated to a corresponding beam pattern through a complex conjugate value stored in the LUT to extract a reception signal component of the corresponding beam pattern.

The LUT and the correlator may be provided to correspond to each of a plurality of beam patterns.

The receiving device may further include: a channel estimating unit estimating channel information of a reception signal by applying each reception signal component extracted by the signal component extracting unit to a channel estimation algorithm; and a decoding unit decoding a reception signal by applying the channel information.

The decoding unit may decode the reception signal using any one digital beamforming algorithm among zero-forcing and minimum mean square error (MMSE).

The decoding unit may decode the reception signal using any one diversity combining technique among selective combining (SC), equal gain combining (EGC), and maximal ratio combining (MRC).

Another exemplary embodiment of the present invention provides a receiving method using a single RF chain, including: controlling a beam pattern of a reception antenna module; radiating a plurality of orthogonal beam patterns to receive a signal; and extracting a reception signal component corresponding to each beam pattern using a reception signal received through the reception antenna module and a code value previously allocated to a plurality of beam patterns.

According to an exemplary embodiment of the present invention, a multiplexing gain and a diversity gain may be provided using a single RF chain without switching or rotating an antenna beam pattern.

In particular, according to an exemplary embodiment of the present invention, SNR performance is increased and adjacent channel interference may be reduced to minimize a degradation of performance, compared with an existing method in which a beam pattern is switched or rotated within one symbol duration.

DETAILED DESCRIPTION OF THE EMBODIMENTS

Figure 1:
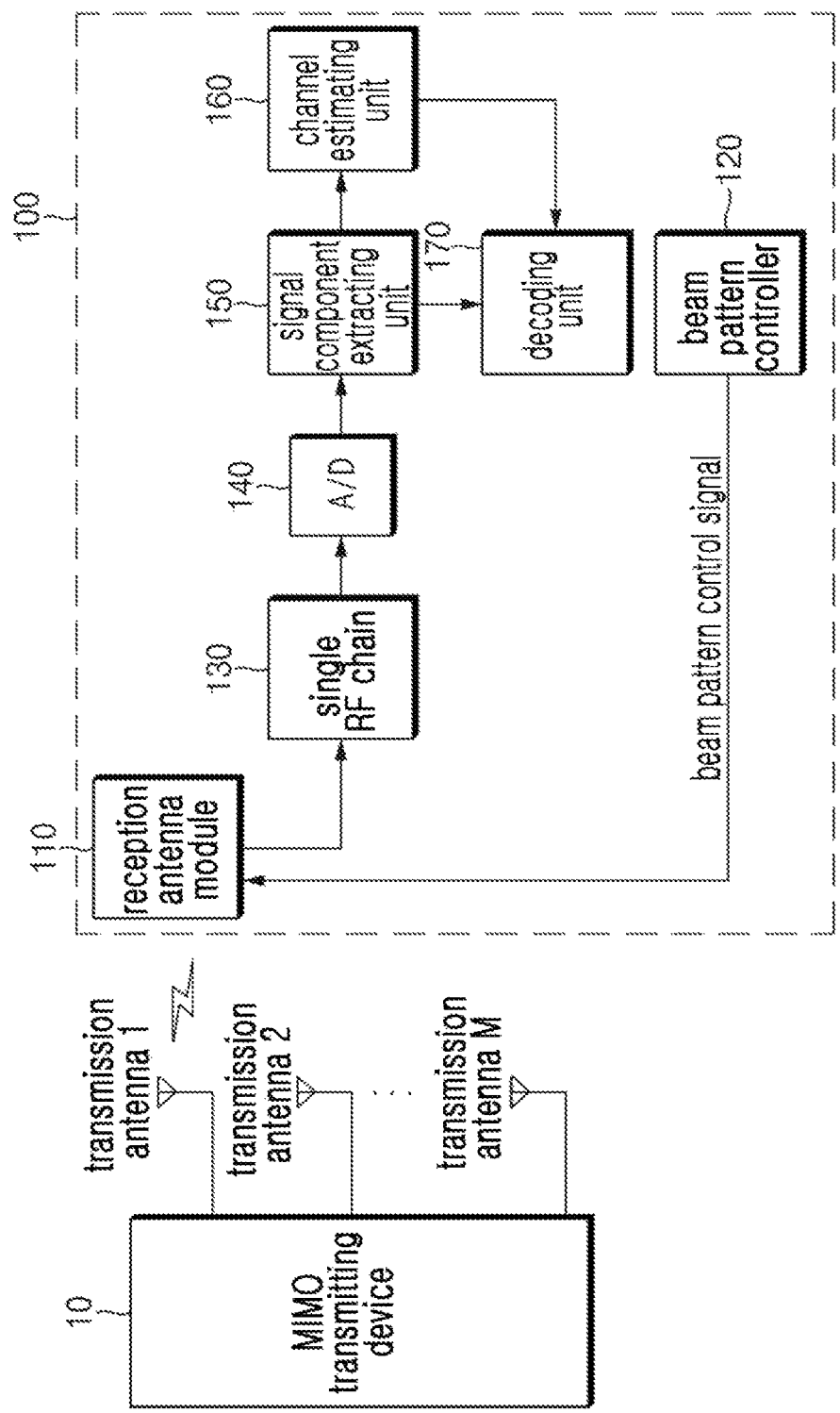
FIG. 1 is a view illustrating a configuration of a receiving device using a single RF chain according to an exemplary embodiment of the present invention.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

In describing the elements of the present invention, terms such as first, second, A, B, (a), (b), etc., may be used. Such terms are used for merely discriminating the corresponding elements from other elements and the corresponding elements are not limited in their essence, sequence, or precedence by the terms. Also, unless indicated otherwise, it is to be understood that all the terms used in the specification, including technical and scientific terms have the same meaning as those that are understood by those skilled in the art to which the present invention pertains. It must be understood that the terms defined by the dictionary are identical with the meanings within the context of the related art, and they should not be ideally or excessively formally defined unless the context clearly dictates otherwise.

FIG. 1 is a view illustrating a configuration of a receiving device using a single RF chain according to an exemplary embodiment of the present invention.

FIG. 1 is a view illustrating a structure of a receiving device 100 and a transmitting device 10 providing a multiplexing gain, and hereinafter, it is assumed that the transmitting device 10 is a multi-input multi-output (MIMO) transmitting device having multiple transmission antennas with M number of transmission antenna arrays.

Referring to FIG. 1, the receiving device 100 using a single RF chain according to the present invention may include a reception antenna module 110, a beam pattern controller 120, a single RF chain 130, an analog-to-digital converter (ADC) 140, a signal component extracting unit 150, a channel estimating unit 160, and a decoding unit 170.

First, the reception antenna module 110 receives a multiplexing signal transmitted through the multi-antenna transmitting device 10 having M number of antenna arrays.

Here, the reception antenna module 110 may receive a signal by a determined radiation pattern, and here, the radiation pattern may be controlled by a beam pattern controller 120.

For example, the radiation pattern of the reception antenna module 110 may be expressed by the sum of N number of mutually orthogonal beam patterns, in other words, by the sum of $F_1(\psi)$, $F_2(\psi)$, ..., and $F_N(\psi)$, and here, a relationship of the N number of mutually orthogonal beam patterns $F_i(\psi)$ and $F_j(\psi)$ may be expressed as Equation 1 below.

$$\frac{1}{2\pi}\int_0^{2\pi}\Phi_i(\psi)\Phi_j^*(\psi)d\psi \approx \begin{cases} 1, & i=j \\ 0, & i \neq j \end{cases} \quad \text{(Equation 1)}$$

In Equation 1, $\psi$ denotes an azimuth angle, and i and j include integers from 1 to N.

Here, $\Phi_i(\psi)$ and $\Phi_j(\psi)$ may have quasi-orthogonal characteristics, and in this case, the relationship of the beam patterns $\Phi_i(\psi)$ and $\Phi_j(\psi)$ may be expressed as Equation 2.

$$\frac{1}{2\pi}\int_0^{2\pi}\Phi_i(\psi)\Phi_j^*(\psi)d\psi \approx \begin{cases} 1, & i=j \\ 0, & i \neq j \end{cases} \quad \text{(Equation 2)}$$

Figure 2:
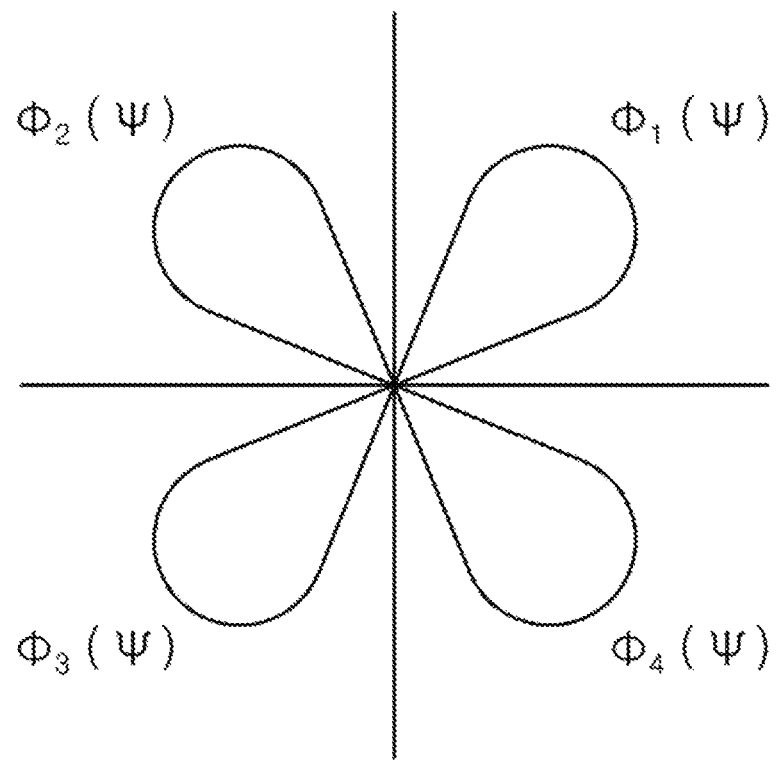
FIG. 2 is a view illustrating a beam pattern structure of a receiving device using a single RF chain according to an exemplary embodiment of the present invention.

For example, a radiation pattern expressed by a linear combination of four mutually orthogonal beam patterns may be expressed as illustrated in FIG. 2.

In the exemplary embodiment illustrated in FIG. 2, a radiation pattern expressed by four mutually orthogonal beam patterns, i.e., the sum of $F_1(\psi)$ and $F_2(\psi)$ and $F_3(\psi)$ and $F_4(\psi)$, is illustrated, but this is merely illustrative and mutually orthogonal beam patterns may be expressed in various forms.

The reception antenna module 110 radiating a radiation pattern expressed by the sum of N number of mutually orthogonal beam patterns as expressed by Equation 1 may be configured as an electrically steerable parasitic array (ESPAR) or a phased array structured antenna.

Here, the ESPAR structured antenna may be configured by disposing one active antenna and one or more parasitic elements having a variable reactance around the active antenna, and the beam pattern controller 120 may control a beam pattern by changing reactance of the parasitic element using a beam pattern control signal.

Meanwhile, the phased array structured antenna may have a plurality of active antennas, and a beam pattern may be controlled by applying a phase shifter to each active antenna and adjusting a phase of each phase shifter. Such phase adjustment is performed through the beam pattern controller 120.

Thus, the beam pattern controller 120 changes an antenna beam pattern at a starting point of each slot to thereby multiplex a reception signal using the reception antenna module 110 providing an antenna radiation pattern given as the sum of N number of mutually orthogonal beam patterns and the single RF chain 130.

The ith orthogonal beam pattern in each time slot is determined according to a codeword allocated to the corresponding beam pattern. For example, a phase of the ith orthogonal beam pattern may be determined according to a codeword allocated to the corresponding beam pattern.

Here, a codeword having a length N allocated to each orthogonal beam pattern has mutually orthogonal characteristics like a Walsh code. Here, the codeword allocated to the beam pattern may have mutually quasi-orthogonal characteristics.

Thus, an antenna radiation pattern in a dth time slot of an ith orthogonal beam pattern may be expressed as Equation 3 below.

$$\Phi_{i,d}(\psi)=c_{i,d}\Phi_i(\psi) \quad \text{(Equation 3)}$$

In Equation 3, $c_{i,d}$ denotes a code value in the dth time slot of the ith orthogonal beam pattern, $\Phi_i$ denotes an ith beam pattern, and $\psi$ denotes an azimuth angle. Thus, the antenna radiation pattern in the dth time slot may be expressed by Equation 4 below.

$$\Phi_{T,d}(\psi)=\sum_{i=1}^{N}c_{i,d}\Phi_i(\psi) \quad \text{(Equation 4)}$$

For example, in the case of four orthogonal beam patterns as illustrated in FIG. 2, a Walsh code expressed by Equation 5 below may be allocated to each orthogonal beam pattern.

$$\begin{bmatrix} C_1 \\ C_2 \\ C_3 \\ C_4 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{(Equation 5)}$$

Here, $c_i$ (i=1, 2, 3, 4) is a codeword allocated to the ith orthogonal beam pattern, and beam radiation patterns $\Phi_{T,1}(\psi)$ and $\Phi_{T,2}(\psi)$, and $\Phi_{T,3}(\psi)$ and $\Phi_{T,4}(\psi)$ of each time slot according to a codeword allocated to each orthogonal beam pattern are as follows.

$$\Phi_{T,1}(\psi) = \Phi_1(\psi) + \Phi_2(\psi) + \Phi_3(\psi) + \Phi_4(\psi)$$

$$\Phi_{T,2}(\psi) = \Phi_1(\psi) - \Phi_2(\psi) + \Phi_3(\psi) - \Phi_4(\psi)$$

$$\Phi_{T,3}(\psi) = \Phi_1(\psi) + \Phi_2(\psi) - \Phi_3(\psi) - \Phi_4(\psi)$$

$$\Phi_{T,4}(\psi) = \Phi_1(\psi) - \Phi_2(\psi) - \Phi_3(\psi) + \psi_4(\psi)$$

A signal received through the reception antenna module 110 is given as an input of the single RF chain 130.

Here, the single RF chain 130 includes an analog band-pass filter (BPF), a low noise amplifier (LNA), a frequency down-converter, and the like. The single RF chain 130 outputs an analog baseband signal corresponding to a signal input from the reception antenna module 110. The analog baseband signal output from the single RF chain 130 is converted into a digital signal through the ADC 140.

The reception signal digitally converted by the ADC 140 is input to the signal component extracting unit 150.

When it is assumed that a channel is not changed during a symbol duration, a reception signal in the dth time slot digitally converted through the ADC 140 may be expressed as Equation 6 below.

$$r_d = c_{1,d}(h_{11}s_1 + h_{12}s_2 + \ldots h_{1M}s_M) + \ldots + c_{N,d}(h_{N1}s_1 + h_{N2}s_2 + \ldots + h_{NM}s_M) + n_d \quad \text{(Equation 6)}$$

Here, in Equation 6, $c_{i,d}$ denotes a code value in the dth time slot of the ith orthogonal beam pattern, $h_{ij}$ denotes a channel gain between a jth transmission antenna and an ith reception orthogonal beam pattern, and $s_j$ denotes a symbol transmitted through the jth transmission antenna. Also, $n_d$ denotes an additive white Gaussian noise (AWGN) component.

The signal component extracting unit 150 extracts a signal component received in each of the mutually orthogonal beam patterns from the digitally converted reception signal. A detailed configuration of the signal component extracting unit 150 will be described in more detail with reference to FIG. 3.

Figure 3:
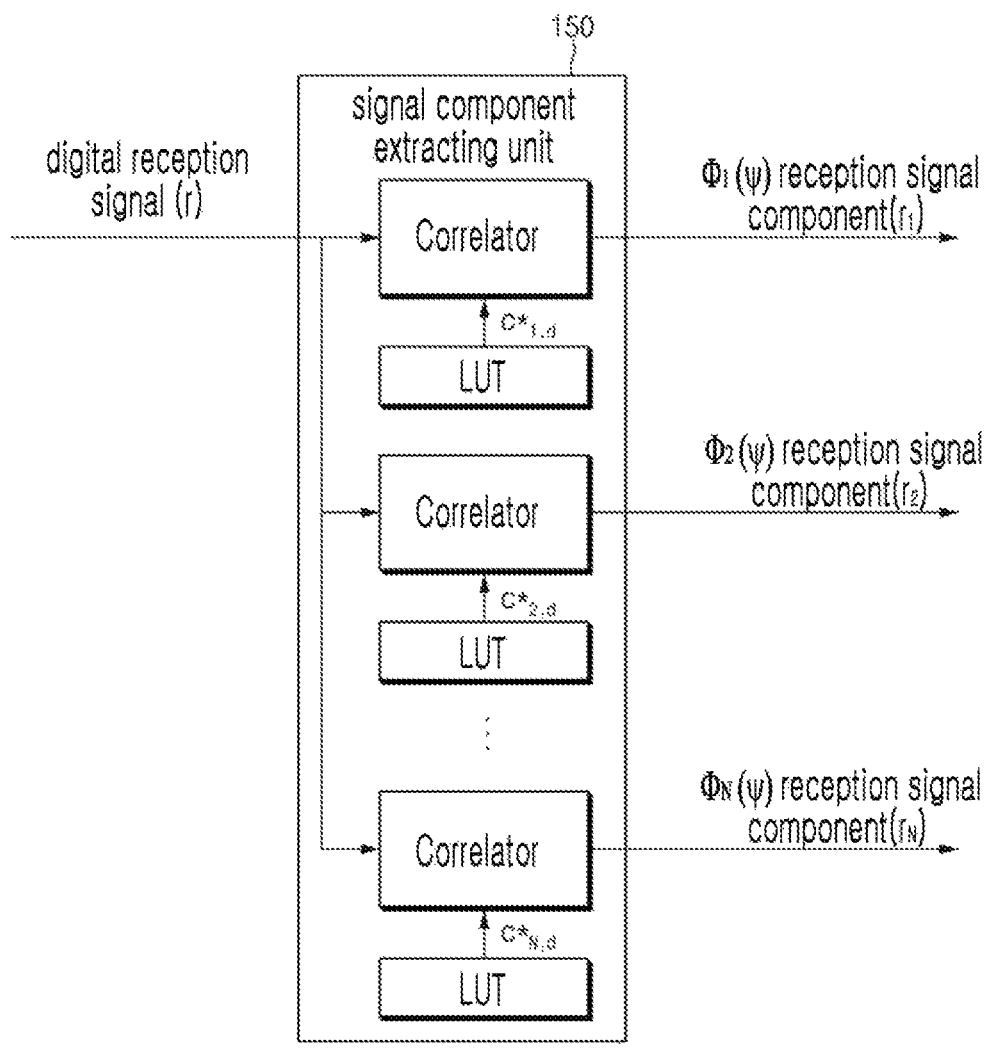
FIG. 3 is a view illustrating a detailed configuration of a signal component extracting unit of FIG. 1.

As illustrated in FIG. 3, the signal component extracting unit 150 includes N number of correlators corresponding to N number of beam patterns $\Phi_1(\psi)$, $\Phi_2(\psi)$, ..., and $\Phi_N(\psi)$ and a look-up table (LUT).

Here, the LUT may include complex conjugate values of codewords respectively allocated to mutually orthogonal beam patterns.

The correlator may calculate a correlation value between the digitally converted reception signal and the codeword allocated to each beam pattern through the complex conjugate value of each code value stored in the LUT to extract a reception signal component of a corresponding beam pattern.

Here, a reception signal component of an ith beam pattern, among the N number of mutually orthogonal beam patterns $\Phi_1(\psi)$, $\Phi_2(\psi)$, ..., and $\Phi_N(\psi)$ may be extracted through mutual correlation calculation given as expressed by Equation 7 below.

$$r_i = \sum_{d=1}^{N} r_d c^*_{i,d} \quad \text{(Equation 7)}$$

In Equation 7, $r_d$ denotes a reception signal in a dth time slot and $c^*_{i,d}$ denotes a complex conjugate of $c_{i,d}$.

Here, each correlator may perform calculation by applying Equation 6 to Equation 7, and may easily calculate reception signal components $r_1$, $r_2$, ..., and $r_N$ regarding each of the reception signal components of the ith beam pattern, i.e., $\Phi_1(\psi)$, $\Phi_2(\psi)$, ..., $\Phi_N(\psi)$.

For example, a correlator corresponding to the first beam pattern $\Phi_1(\psi)$ may extract a complex conjugate $c^*_{1,d}$ regarding a code value $c_{1,d}$ allocated to a first beam pattern from the LUT and calculate a correlation value between the digitally converted reception signal $r_d$ and the code value $c_{1,d}$ allocated to $\phi_1(\psi)$ through the extracted complex conjugate $c^*_{1,d}$ is to calculate the reception signal component $r_1$ regarding the first beam pattern $\Phi_1(\psi)$.

In this manner, a correlator corresponding to the Nth beam pattern $\Phi_N(\psi)$ may extract the complex conjugate $c^*_{N,d}$ regarding the code value $c_{N,d}$ allocated to the Nth beam pattern from the LUT and calculate a correlation value between the digitally converted reception signal $r_d$ and the code value $c_{N,d}$ allocated to the Nth beam pattern $\Phi_N(\psi)$ through the extracted $c^*_{N,d}$ to calculate a reception signal component $r_N$ regarding the Nth beam pattern $\Phi_N(\psi)$.

The reception signal components $r_1$, $r_2$, ..., and $r_N$ respectively regarding the $\Phi_1(\psi)$, $\Phi_2(\psi)$, ..., and $\Phi_N(\psi)$ calculated in this manner may be expressed as Equation 8 below.

$$\begin{aligned} r_1 &= \sum_{d=1}^{N} r_d c^*_{1,d} = h_{11}s_1 + h_{12}s_2 + \ldots h_{1M}s_M + n_1 \\ r_2 &= \sum_{d=1}^{N} r_d c^*_{2,d} = h_{21}s_1 + h_{22}s_2 + \ldots h_{2M}s_M + n_2 \\ &\vdots \\ r_N &= \sum_{d=1}^{N} r_d c^*_{N,d} = h_{N1}s_1 + h_{N2}s_2 + \ldots + h_{NM}s_M + n_N \end{aligned} \quad \text{(Equation 8)}$$

When the thusly calculated $r_1$, $r_2$, ..., and $r_N$ are organized in a matrix form, the reception signal (r) may be expressed as Equation 9 below.

$$r = Hs + n \quad \text{(Equation 9)}$$

In Equation 9, H denotes an N× M channel gain matrix, s denotes a M×1 transmission symbol matrix, and n denotes an N×1 AWGN component matrix.

The channel estimating unit 160 estimates a channel gain through a generally used channel estimation algorithm. Thus, the channel estimating unit 160 estimates a channel gain H of Equation 9 and provides the estimated channel gain H to the decoding unit 170.

When the channel gain H is estimated by the channel estimating unit 160, the decoding unit 170 may perform decoding through an existing digital beamforming algorithm such as zero-forcing, minimum mean square error (MMSE), and the like, using the channel gain H.

Figure 4:
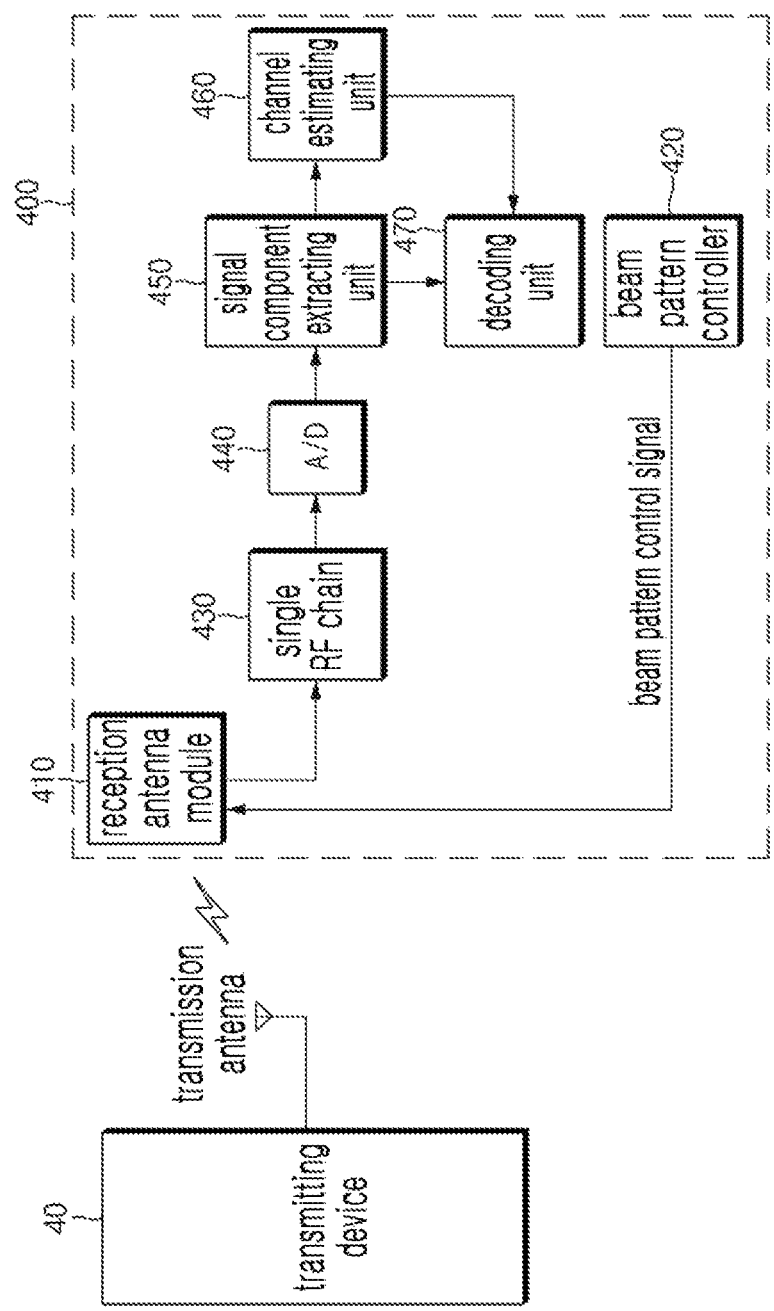
FIG. 4 is a view illustrating a configuration of a receiving device using a single RF chain according to another exemplary embodiment of the present invention.

FIG. 4 is a view illustrating a configuration of a receiving device using a single RF chain according to another exemplary embodiment of the present invention.

Here, the embodiment illustrated in FIG. 4 illustrates a structure of the receiving device 400 and a transmitting device 40 providing a diversity gain. Here, it is assumed that the transmitting device 40 is a multi-input/output transmitting device having a single transmission antenna.

Referring to FIG. 4, the receiving device using a single RF chain according to the present invention may include a reception antenna module 410, a beam pattern controller 420, a single RF chain 430, an ADC 440, a signal component extracting unit 450, a channel estimating unit 460, and a decoding unit 470.

The receiving device 400 providing a diversity gain illustrated in FIG. 4 has the same structure as that of the receiving device 100 providing a multiplexing gain illustrated in FIG. 1, and a repeated description of the same component performing the same function will be omitted.

First, when a radiation pattern is expressed by the sum of N number of mutually orthogonal beam patterns, the reception antenna module 410 may obtain a diversity gain using the single RF chain 430. Here, the N number of mutually orthogonal beam patterns may be controlled by the beam pattern controller 420.

The radiation pattern implemented by the N number of mutually orthogonal beam patterns by the beam pattern controller 420 may have the relationship expressed by Equation 1 described above.

The beam pattern controller 420 may change an antenna beam pattern at a starting point of each slot for diversity combining.

The ith orthogonal beam pattern in each time slot is determined according to a codeword allocated to the corresponding beam pattern. For example, a phase of the ith orthogonal beam pattern may be determined according to a codeword allocated to the corresponding beam pattern. Here, an antenna radiation pattern of the dth time slot in the ith orthogonal beam pattern may be expressed as Equation 3 described above, and an antenna radiation pattern in the dth time slot may be expressed as Equation 4 described above.

For example, when a codeword allocated to each orthogonal beam pattern is the same as that expressed by Equation 5, a beam radiation pattern of each time slot according to a codeword allocated to each orthogonal beam pattern may be easily calculated from Equation 4.

Here, a codeword having a length of N allocated to each orthogonal beam pattern has mutual orthogonal characteristics such as those of a Walsh code. Here, a codeword allocated to a beam pattern may have mutual quasi-orthogonal characteristics.

The signal received through the reception antenna module 410 and the single RF chain 430 is converted into a digital signal by the ADC 440, and the reception signal digitally converted by the ADC 440 is input to the signal component extracting unit 450.

When it is assumed that a channel is not changed during a symbol duration, the reception signal in the dth time slot digitally converted through the ADC 440 may be expressed as Equation 10 below.

$$r_d = c_{1,d}h_1s + c_{2,d}h_2s + \ldots c_{N,d}h_Ns + n_d \quad \text{(Equation 10)}$$

In Equation 10, $c_{i,d}$ denotes a code value in the dth time slot of the ith orthogonal beam pattern, $h_i$ denotes a channel gain between a transmission antenna and an ith reception orthogonal beam pattern, and s denotes a symbol transmitted through a transmission antenna. Also, $n_d$ denotes an additive white Gaussian noise (AWGN) component.

Here, Equation 10 corresponds to Equation 6, and in the case of FIG. 4, since the transmitting device 40 has a single transmission antenna, an expression different from Equation 6 is applied.

The signal component extracting unit 450 extracts a reception signal component from each of mutually orthogonal beam pattern included in the digitally converted reception signal. Here, a detailed configuration of the signal component extracting unit 450 is the same as that illustrated in FIG. 3.

A reception signal component of the ith beam pattern, among the N number of mutually orthogonal beam patterns $\Phi_1(\psi), \Phi_2(\psi) \ldots,$ and $\Phi_N(\psi)$ may be expressed as Equation 7 described above.

Here, the signal component extracting unit 450 may easily calculate the reception signal components regarding N number of beam patterns, that is, reception signal components $r_1, r_2, \ldots,$ and $r_N$ respectively regarding $\Phi_1(\psi), \Phi_2(\psi), \ldots, \Phi_N(\psi)$ by applying Equation 10 to Equation 7, and may express the same as expressed by Equation 11.

$$r_1 = \sum_{d=1}^{N} r_d c_{1,d}^* = h_1 s + n_1 \quad \text{(Equation 11)}$$

$$r_2 = \sum_{d=1}^{N} r_d c_{2,d}^* = h_2 s + n_2$$

$$\vdots$$

$$r_N = \sum_{d=1}^{N} r_d c_{N,d}^* = h_N s + n_N$$

When the thusly calculated reception signal components $r_1, r_2, \ldots, r_N$ are organized in a matrix form, the reception signal (r) may be expressed as Equation 11.

$$r = Hs + n \quad \text{(Equation 12)}$$

Equation 12 has the same form as that of Equation 9, but in Equation 12, H denotes a N×1 channel gain matrix, s denotes a transmission symbol, and n denotes an N×1 AWGN component matrix.

The channel estimating unit 460 estimates a channel through a generally used channel estimation algorithm. Thus, the channel estimating unit 460 estimates H of Equation 12 and provides the estimated H to the decoding unit 470.

When H is estimated by the channel estimating unit 460, the decoding unit 470 may obtain a symbol having a diversity gain using a diversity combining technique such as existing selective combining (SC), equal gain combining (EGC), maximal ratio combining (MRC), and the like on the basis of the estimated H.

An operational flow of a receiving device using a single RF chain according to the present invention configured described above will be described in detail.

Figure 5:
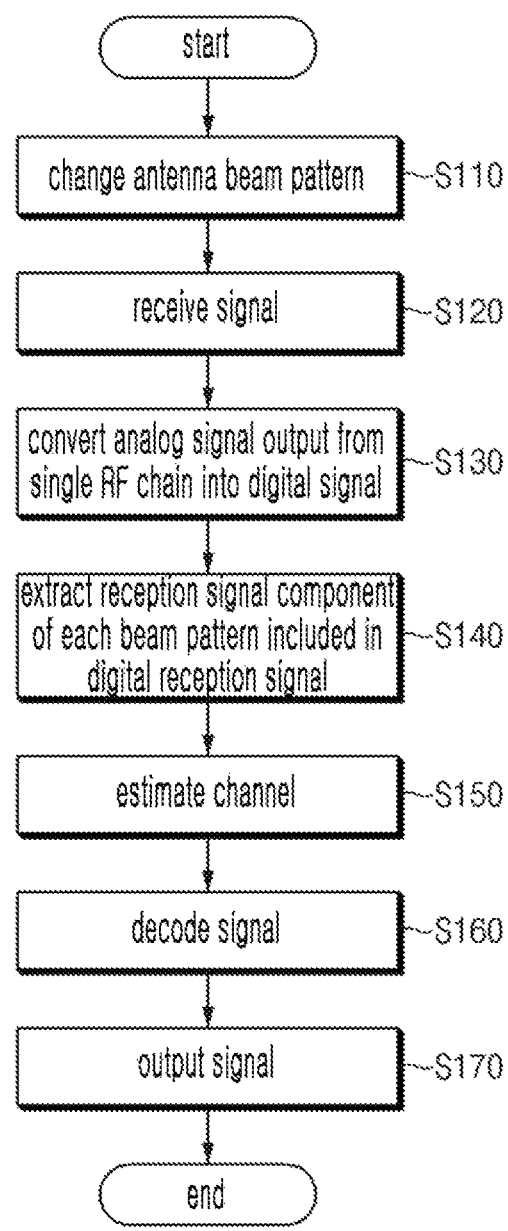
FIGS. 5 to 7 are flow charts illustrating an operation of a receiving method using a single RF chain according to an exemplary embodiment of the present invention.
Figure 6:
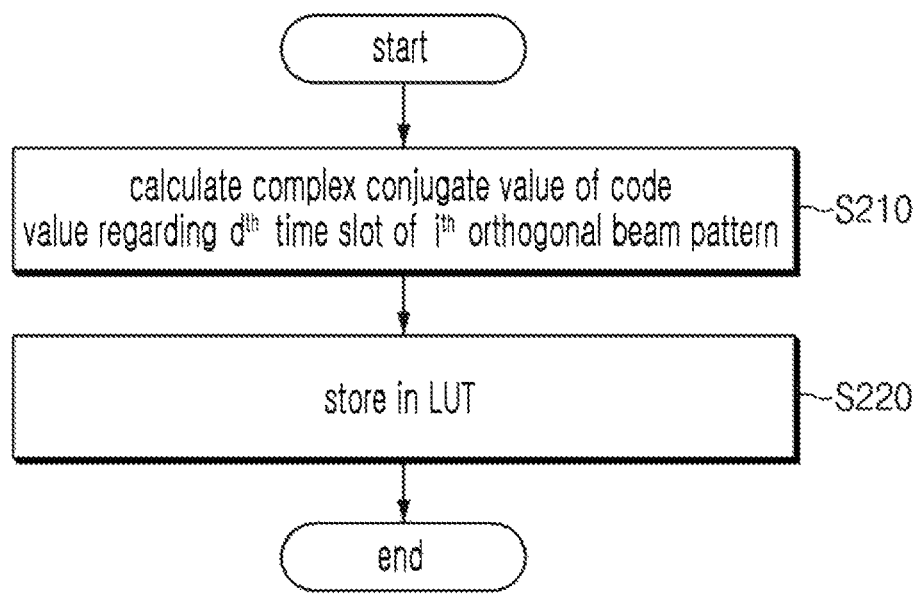
Figure 7:
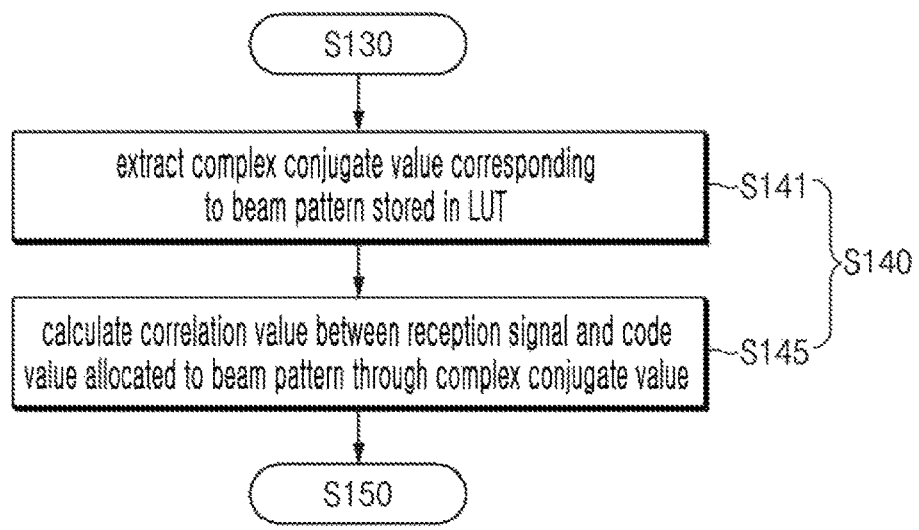

FIGS. 5 to 7 are flow charts Illustrating an operation of a receiving method using a single RF chain according to an exemplary embodiment of the present Invention.

Referring to FIG. 5, a receiving device using a single RF chain according to the present invention changes an antenna beam pattern to provide a multiplexing gain and/or diversity gain through the single RF chain in operation S110 and receives a signal transmitted from a transmitting device in operation S120.

The receiving device converts an analog baseband signal received through a reception antenna module and output through the single RF chain into a digital signal through an ADC in operation S130. Here, the receiving device extracts a reception signal component from each beam pattern Included in the reception signal digitally converted in operation S130, in operation S140.

Here, before extracting a reception signal component from each beam pattern included in the reception signal, the receiving device may calculate a complex conjugate value of a code value regarding a $d^{th}$ time slot of an $i^{th}$ orthogonal beam pattern in operation S210 and store the complex conjugate value calculated in operation S210 in the LUT in operation S220, as illustrated in FIG. 6.

Thus, when the receiving device performs operation S140, the receiving device may extract a complex conjugate value stored in the LUT in operation S141 and calculate a correlation value between the digitally converted reception signal and the code value allocated to the orthogonal beam pattern through the complex conjugate value extracted in operation S141, in operation S145 to extract a reception signal component regarding the corresponding beam pattern as illustrated in FIG. 7.

Thereafter, the receiving device estimates a channel gain from a reception signal component corresponding to each beam pattern extracted in operation S140, in operation S150, and decode the reception signal using the estimated channel gain in operation S160. Thus, the receiving device outputs the signal obtained in operation S160.

Here, the receiving device may obtain a signal providing a multiplexing gain by applying the reception signal to a digital beamforming algorithm using the estimated channel gain, or obtain a signal providing a diversity gain through a diversity combining technique.

Although a few exemplary embodiments have been shown and described, it will be appreciated by those skilled in the art that changes may be made in these exemplary embodiments without departing from the principles and spirit of the invention, the range of which is defined in the appended claims and their equivalents.

Accordingly, the exemplary embodiments of the present invention are provided to explain the technical spirit of the present invention but not to limit such spirit. The scope of the technical spirit of the present invention is not limited by the exemplary embodiments of the present invention. The scope of protection of the present invention should be interpreted by the claims below, and all technical spirits which are in the same scope would be interpreted as being included in the scope of right of the present invention.

What is claimed is:

1. A receiving device using a single RF chain, the receiving device comprising:
    a reception antenna module radiating a plurality of orthogonal beam patterns to receive a signal;
    a single RF chain processing a reception signal from the reception antenna module;
    a signal component extracting unit extracting a reception signal component corresponding to each beam pattern using the reception signal received through the reception antenna module and the single RF chain and a code value previously allocated to the plurality of beam patterns; and
    a beam pattern controller controlling a beam pattern radiated by the reception antenna module,
    wherein the beam pattern controller changes a beam pattern of the reception antenna module at each time slot.

2. The receiving device of claim 1, wherein the beam pattern controller controls a beam pattern to correspond to a codeword allocated to each beam pattern.

3. The receiving device of claim 1, wherein the beam pattern controller determines a phase of a corresponding beam pattern according to a codeword allocated to each beam pattern.

4. The receiving device of claim 2, wherein the codeword has orthogonal characteristics.

5. A receiving device using a single RF chain, the receiving device comprising:
    a reception antenna module radiating a plurality of orthogonal beam patterns to receive a signal;
    a single RF chain processing a reception signal from the reception antenna module:
    a signal component extracting unit extracting a reception signal component corresponding to each beam pattern using the reception signal received through the reception antenna module and the single RF chain and a code value previously allocated to the plurality of beam patterns; and
    a beam pattern controller controlling a beam pattern radiated by the reception antenna module,
    wherein the signal component extracting unit includes:
    a look-up table (LUT) storing a complex conjugate value of a code value allocated to each of a plurality of beam patterns; and
    a correlator calculating a correlation value between a reception signal and a code value allocated to a corresponding beam pattern through a complex conjugate value stored in the LUT to extract a reception signal component of the corresponding beam pattern.

6. The receiving device of claim 5, wherein the LUT and the correlator are provided to correspond to each of a plurality of beam patterns.

7. The receiving device of claim 1, further comprising:
    a channel estimating unit estimating channel information of a reception signal by applying each reception signal component extracted by the signal component extracting unit to a channel estimation algorithm; and
    a decoding unit decoding a reception signal by applying the channel information.

8. The receiving device of claim 7, wherein the decoding unit decodes the reception signal using a digital beamforming algorithm.

9. The receiving device of claim 7, wherein the decoding unit decodes the reception signal using any one diversity combining technique among selective combining (SC), equal gain combining (EGC), and maximal ratio combining (MRC).

10. A receiving method using a single RF chain, the receiving method comprising:
    controlling a beam pattern radiated by a reception antenna module;
    radiating, by the reception antenna module, a plurality of orthogonal beam patterns to receive a signal; and
    extracting a reception signal component corresponding to each beam pattern using a reception signal received through the reception antenna module and a single RF chain and a code value previously allocated to a plurality of beam patterns,
    wherein the controlling of the beam pattern of the reception antenna module includes:
    dividing a symbol duration of a reception signal by a plurality of time slots; and
    changing a beam pattern of the reception antenna module at each time slot.

11. The receiving method of claim 10, wherein in the controlling of the beam pattern of the reception antenna module, a beam pattern is controlled to correspond to a codeword allocated to each of the plurality of orthogonal beam patterns.

12. The receiving method of claim 10, wherein in the controlling of the beam pattern of the reception antenna module, a phase of a corresponding beam pattern is determined according to a codeword allocated to each of the plurality of orthogonal beam patterns.

13. The receiving method of claim 12, wherein the codeword has orthogonal characteristics.

14. The receiving method of claim 10, wherein the extracting of the reception signal component includes:
- storing a complex conjugate value of a code value allocated to each of a plurality of beam patterns in a look-up table (LUT); and
- calculating a correlation value between a reception signal and a code value allocated to a corresponding beam pattern through a complex conjugate value stored in the LUT to extract a reception signal component of the corresponding beam pattern.

* * * * *